United States Patent
Shenaq et al.

(10) Patent No.: US 10,787,052 B2
(45) Date of Patent: Sep. 29, 2020

(54) VEHICLE TOW HOOK

(71) Applicant: Ford Global Technologies, LLC, Dearborn, MI (US)

(72) Inventors: Mohammed Shenaq, Dearborn, MI (US); Mustafa Ahmed, Canton, MI (US); Sudip Sankar Bhattacharjee, Novi, MI (US); Ray Hari Manala Rethinam, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 225 days.

(21) Appl. No.: 16/038,392

(22) Filed: Jul. 18, 2018

(65) Prior Publication Data

US 2020/0023697 A1    Jan. 23, 2020

(51) Int. Cl.
  *B60D 1/54*   (2006.01)
  *B60D 1/56*   (2006.01)

(52) U.S. Cl.
  CPC ............. *B60D 1/54* (2013.01); *B60D 1/565* (2013.01)

(58) Field of Classification Search
  CPC .................................. B60D 1/54; B60D 1/565
  See application file for complete search history.

(56) References Cited

U.S. PATENT DOCUMENTS

| | | | |
|---|---|---|---|
| 2,783,039 A * | 2/1957 | Wilson | F16F 3/04 267/138 |
| 3,868,098 A * | 2/1975 | Coombs | B60D 1/50 267/138 |
| 4,382,609 A * | 5/1983 | Hemmings | B60D 1/50 280/416.2 |
| 4,610,458 A * | 9/1986 | Garnham | B60D 1/485 224/516 |
| 6,250,664 B1 * | 6/2001 | Tetrick | B60D 1/249 280/491.5 |
| 6,260,873 B1 * | 7/2001 | Bishel | B60D 1/145 267/138 |
| 6,382,654 B1 * | 5/2002 | Mahncke | B60D 1/488 280/491.1 |
| 6,554,333 B2 * | 4/2003 | Shimotsu | B60R 19/34 293/132 |
| 6,908,129 B2 * | 6/2005 | Shimotsu | B60R 19/34 293/132 |
| 7,290,783 B2 | 11/2007 | Dornbos | |
| 7,758,060 B2 * | 7/2010 | Lopez | B60D 1/488 280/495 |

(Continued)

FOREIGN PATENT DOCUMENTS

| CN | 104044419 A | 9/2014 |
|---|---|---|
| DE | 2949276 A1 | 6/1981 |

(Continued)

*Primary Examiner* — Ruth Ilan
*Assistant Examiner* — Conan D Duda
(74) *Attorney, Agent, or Firm* — Frank A. MacKenzie; Bejin Bieneman PLC

(57) ABSTRACT

A tow apparatus includes a front bumper, a housing rigidly attached to the front bumper, and a tow hook slidable in the housing. The housing and the tow hook define a closed chamber, and the closed chamber is filled with a compressible fluid. Sliding the tow hook in the housing in a direction that decreases the volume of the closed chamber compresses the compressible fluid.

17 Claims, 3 Drawing Sheets

(56) References Cited

U.S. PATENT DOCUMENTS

| | | | | |
|---|---|---|---|---|
| 7,775,546 B2* | 8/2010 | Asjad | | B60D 1/488 |
| | | | | 280/498 |
| 8,317,238 B2* | 11/2012 | Haneda | | B21D 39/032 |
| | | | | 293/117 |
| 8,371,602 B1* | 2/2013 | Peschansky | | B60D 1/04 |
| | | | | 280/446.1 |
| 8,590,950 B2* | 11/2013 | Hermanson | | B60D 1/565 |
| | | | | 293/102 |
| 9,114,679 B2* | 8/2015 | Hood | | B60D 1/14 |
| 9,441,696 B2* | 9/2016 | McCurter | | B60D 1/50 |
| 9,457,746 B1* | 10/2016 | Baccouche | | B60R 19/34 |
| 9,637,076 B2* | 5/2017 | Midoun | | B60R 19/34 |
| 9,981,516 B1* | 5/2018 | Alvarez | | B60D 1/54 |
| 2003/0209915 A1* | 11/2003 | Yoshida | | B60R 19/34 |
| | | | | 293/133 |
| 2003/0222477 A1* | 12/2003 | Yoshida | | F16F 7/125 |
| | | | | 296/187.03 |
| 2011/0233947 A1* | 9/2011 | Baccouche | | B60R 19/34 |
| | | | | 293/133 |
| 2015/0129381 A1* | 5/2015 | Ditzler | | B64C 25/58 |
| | | | | 188/313 |
| 2015/0345586 A1* | 12/2015 | de Kock | | F16F 9/46 |
| | | | | 188/313 |
| 2015/0354656 A1* | 12/2015 | Tanaka | | F16F 9/3484 |
| | | | | 188/322.15 |
| 2016/0327114 A1* | 11/2016 | Schmidt | | F16F 9/36 |
| 2018/0257445 A1* | 9/2018 | Degenkolb | | B60D 1/488 |
| 2019/0084361 A1* | 3/2019 | Ghannam | | B60D 1/243 |
| 2019/0217673 A1* | 7/2019 | Shenaq | | B60D 1/54 |
| 2019/0217676 A1* | 7/2019 | Blackwell | | B60D 1/54 |
| 2020/0023697 A1* | 1/2020 | Shenaq | | B60D 1/565 |

FOREIGN PATENT DOCUMENTS

| | | |
|---|---|---|
| IN | 201641029708 A | 3/2018 |
| WO | 2014037895 A2 | 3/2014 |
| WO | 2014200359 A1 | 12/2014 |

* cited by examiner

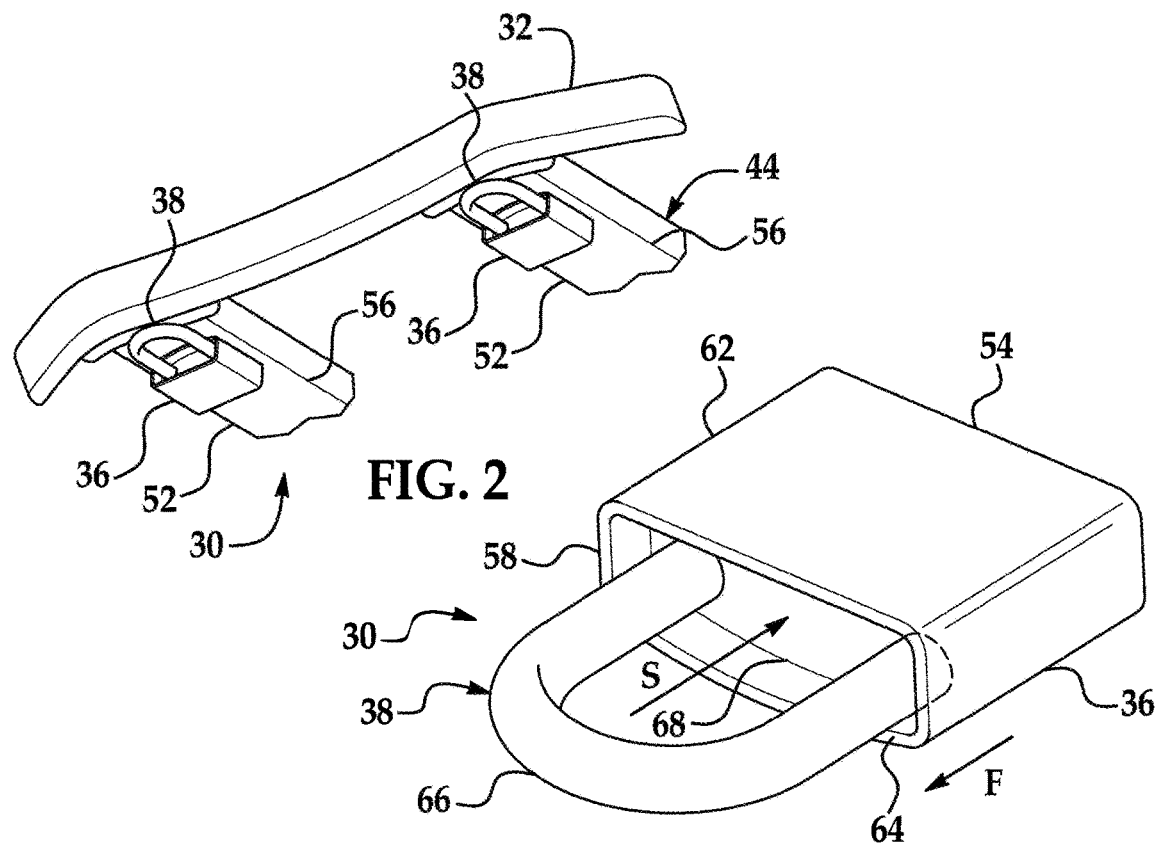
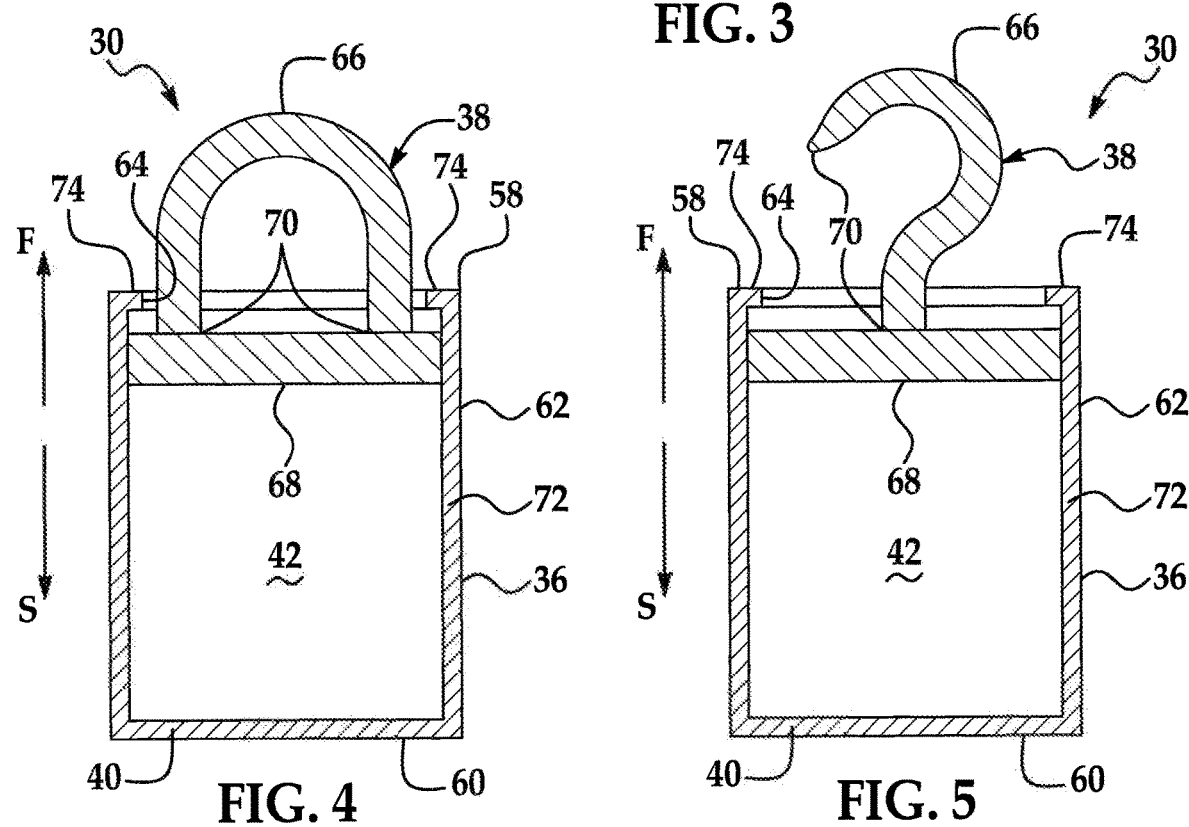

VEHICLE TOW HOOK

BACKGROUND

Vehicles typically include tow hooks used for towing the vehicle, for example, if the vehicle becomes stuck in mud or snow. The tow hooks serve as attachment points for straps to be attached to the vehicle, and the straps are then used to pull the vehicle. U.S. regulations generally require four tow hooks fixed to a frame of the vehicle. Vehicles typically locate two tow hooks on the front end of the vehicle, which allows a towing vehicle to pull the vehicle forward.

BRIEF DESCRIPTION OF THE DRAWINGS

FIG. 2 is a bottom perspective view of an example tow apparatus and a frame of the vehicle.

FIG. 3 is a perspective view of the tow apparatus.

FIG. 4 is a top cross-sectional view of the tow apparatus.

FIG. 5 is a top cross-sectional view of a second example tow apparatus.

DETAILED DESCRIPTION

Figure 1:
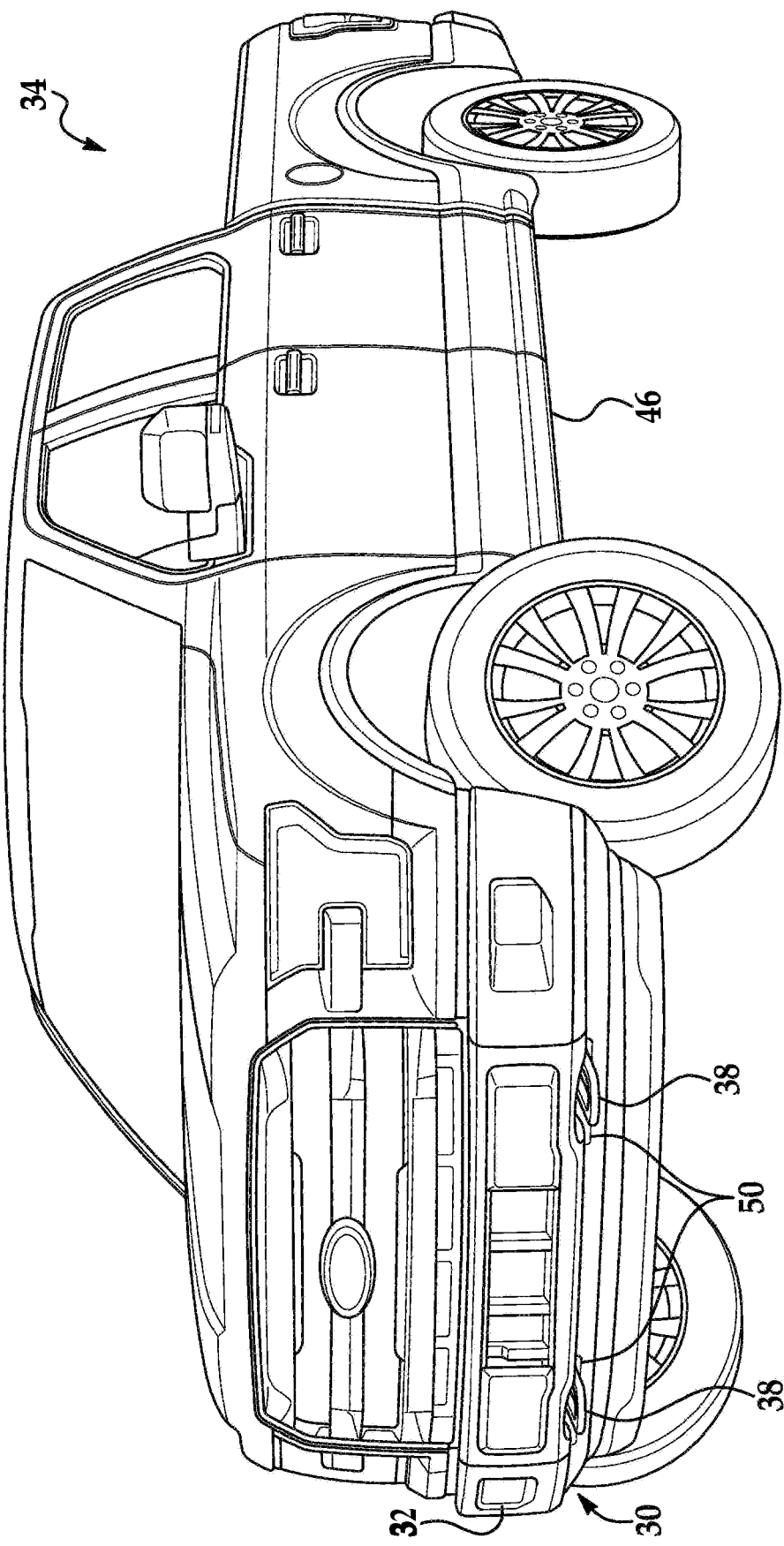
FIG. 1 is a perspective view of a vehicle.

A tow apparatus includes a front bumper, a housing rigidly attached to the front bumper, and a tow hook slidable in the housing. The housing and the tow hook define a closed chamber, and the closed chamber is filled with a compressible fluid.

The tow hook may include a bar member having a curved shape. The bar member may be U-shaped.

The bar member may include two ends and may be elongated from one end to the other end, and the housing may include two parallel tunnels sized to receive the ends of the bar member. The housing may include a connecting chamber open to both tunnels, and the closed chamber may be defined by the two ends of the bar member, the two tunnels, and the connecting chamber.

The tow hook may include a base member, and the base member may be slidable in the housing. The housing may define a sliding direction of the tow hook, the bar member may be elongated from an end that is directly attached to the base member, and the cross-sectional area of the end of the bar member orthogonal to the sliding direction may be less than the cross-sectional area of the base member orthogonal to the sliding direction. The housing may include a tunnel receiving the base member and terminating at an opening, and the opening may include a lip extending inward relative to the tunnel. The housing may include a back wall, the tunnel may extend to the back wall, and the closed chamber may be defined by the tow hook, the tunnel, and the back wall.

The bar member may be U-shaped and may be elongated from one end to another end, and the ends may be directly attached to the base member.

The front bumper may define a forward direction, and the tow hook may be slidable in the housing along the forward direction.

The tow apparatus may further include a frame member transverse to and fixed to the front bumper, and the housing may be directly attached to the frame member. A top surface of the housing may be directly attached to a bottom surface of the frame member. The top surface of the housing may be fastened to the bottom surface of the frame member.

The compressible fluid may be a compressible gas.

The compressible fluid may be a non-Newtonian fluid. The compressible fluid may be a shear-thinning fluid.

Sliding the tow hook in the housing in a direction that decreases the volume of the closed chamber may compress the compressible fluid.

A tow apparatus 30 includes a front bumper 32 of a vehicle 34, at least one housing 36 rigidly attached to the front bumper 32, and a tow hook 38 slidable in each housing 36. The housing 36 and the tow hook 38 define a closed chamber 40, and the closed chamber 40 is filled with a compressible fluid 42.

The tow apparatus 30 can provide the typical functionality of a tow hook while reducing a force experienced by an object in the event of an impact with the tow hook 38. The pressure of the compressible fluid 42 along with the structure of the housing 36 can hold the tow hook 38 in a position for use as a tow hook. In the event of an impact with an object, the tow hook 38 can slide into the housing 36 and compress the compressible fluid 42. The compression of the compressible fluid 42 can absorb energy from the impact, which may reduce injuries energy transferred to the object.

With reference to FIG. 1, the vehicle 34 includes a frame 44. The vehicle 34 may be of a body-on-frame construction, in which the frame 44 supports a body 46 that is a separate component from the frame 44. The vehicle 34 may, alternatively, be of a unibody construction, in which the frame 44 and the body 46 of the vehicle 34 are a single component. The frame 44 and body 46 may be formed of any suitable material, for example, steel, aluminum, etc.

With reference to FIGS. 1 and 2, the front bumper 32 extends across a front of the vehicle 34. The front bumper 32 is elongated in a lateral direction, i.e., a horizontal cross-vehicle direction. The front bumper 32 defines a forward direction F, i.e., a longitudinal direction, i.e., a direction of forward travel of the vehicle 34. The front bumper 32 may reinforce the structural integrity of the vehicle 34. The front bumper 32 may be formed of any suitable material, for example, steel, aluminum, etc. The front bumper 32 may present a class-A surface, i.e., a surface specifically manufactured to have a high-quality, finished aesthetic appearance free of blemishes. Alternatively, a fascia (not shown) may cover the front bumper 32.

The front bumper 32 may include access holes 50 for the tow hooks 38. The access holes 50 may be longitudinally aligned with the tow hooks 38, i.e., aligned in a direction of forward travel of the vehicle 34. The access holes 50 may be sized to permit access to the tow hooks 38. The tow hooks 38 may extend through the access holes 50, as shown in FIG. 1, or alternatively, the tow hooks 38 may be positioned behind the front bumper 32, and panels (not shown) concealing the tow hooks 38 may be positioned in the access holes 50.

The vehicle 34 may include two housings 36. The housings 36 are rigidly attached to the front bumper 32. For the purposes of this disclosure, "rigidly attached" is defined as attached to and fixed relative to. The housings 36 may be directly or indirectly attached to the front bumper 32. For example, the housings 36 may be directly attached to a frame member 52 of the frame 44, and the frame member 52 may be attached to the front bumper 32, as shown in FIG. 2. A top surface 54 of each housing 36 may be directly attached, e.g., fastened, to a bottom surface 56 of the frame member 52.

With reference to FIGS. 3-7, the housing 36 includes a front end 58 facing in the forward direction F, a back wall 60 opposite the front end 58, and a lateral surface 62 extending from the front end 58 to the back wall 60. The front end 58 includes one or more openings 64 that the tow hook 38 extends through. The lateral surface 62 includes the top surface 54. The housing 36 defines a sliding direction S of the tow hook 38. For example, the sliding direction S may be along and/or opposite the forward direction F.

The tow hook 38 is slidable in the housing 36 in the sliding direction S, e.g., along the forward direction F. The tow hook 38 includes a bar member 66 having a curved shape. The curved shape of the bar member 66 permits straps to be attached to the tow hook 38 for towing, recovering the vehicle 34, etc.

The housing 36 and the tow hook 38 define the closed chamber 40. The housing 36 and the tow hook 38 are fitted together such that the compressible fluid 42 cannot escape the closed chamber 40. The closed chamber 40 may be watertight and/or airtight; i.e., an interface between the housing 36 and the tow hook may be watertight and/or airtight. The sliding of the tow hook 38 in the housing 36 causes the volume of the closed chamber 40 to change. As the tow hook 38 slides rearward, i.e., further into the housing 36, the closed chamber 40 shrinks, i.e., decreases in volume. As the tow hook 38 slides forward, i.e., further out of the housing 36, the closed chamber 40 grows, i.e., increases in volume.

The closed chamber 40 is filled with the compressible fluid 42. As the volume of the closed chamber 40 changes, the pressure exerted by the compressed fluid against the closed chamber 40 changes. As the volume of the closed chamber 40 shrinks, the pressure exerted by the compressible fluid 42 increases, and as the volume of the closed chamber 40 grows, the pressure exerted by the compressible fluid 42 decreases. The compressible fluid 42 may be, e.g., a compressible gas. The compressible gas may be pressurized in the closed chamber 40, i.e., the pressure of the compressible gas may be greater than atmospheric pressure for all positions of the tow hook 38 in the housing 36. Alternatively, the compressible fluid 42 may be a non-Newtonian fluid, e.g., a shear-thinning fluid. The pressure exerted by the compressible fluid 42 may change nonlinearly with the change in volume of the closed chamber 40.

FIGS. 3-5 show two examples of the tow apparatus 30. The tow hook 38 includes the bar member 66 and a base member 68. The bar member 66 is elongated between two ends 70, i.e., from one end 70 to another end 70, in a curved shape. In a first example, the bar member 66 may be U-shaped, and both ends 70 may be directly attached to the base member 68, as shown in FIGS. 3 and 4. Alternatively, in a second example, the bar member 66 may be elongated from one end 70 directly attached to the base member 68 to the other end 70, which is free and not directly attached, as shown in FIG. 5. In both examples, the base member 68 is slidable in the housing 36, and the bar member 66 is spaced from the housing 36. The base member 68 may have a constant cross-sectional shape along the sliding direction S. The cross-sectional area of the one or both ends 70 of the bar member 66 orthogonal to the sliding direction S is less than the cross-sectional area of the base member 68 orthogonal to the sliding direction S.

With continued reference to the examples of the tow apparatus 30 in FIGS. 3-5, the housing 36 includes one opening 64 at the front end 58. The housing 36 includes a tunnel 72 terminating at the opening 64 and extending to the back wall 60. The opening 64 includes a lip 74 extending inward relative to the tunnel 72. The lip 74 is positioned to prevent the tow hook 38, specifically the base member 68, from sliding entirely out of the housing 36. The closed chamber 40 is defined by the tow hook 38, specifically the base member 68; the tunnel 72; and the back wall 60. The volume of the closed chamber 40 equals a cross-sectional area of the tunnel 72 multiplied by a distance from the back wall 60 to the base member 68. As the base member 68 slides closer to the back wall 60, the volume decreases and the pressure of the compressed fluid increases.

Figure 6:
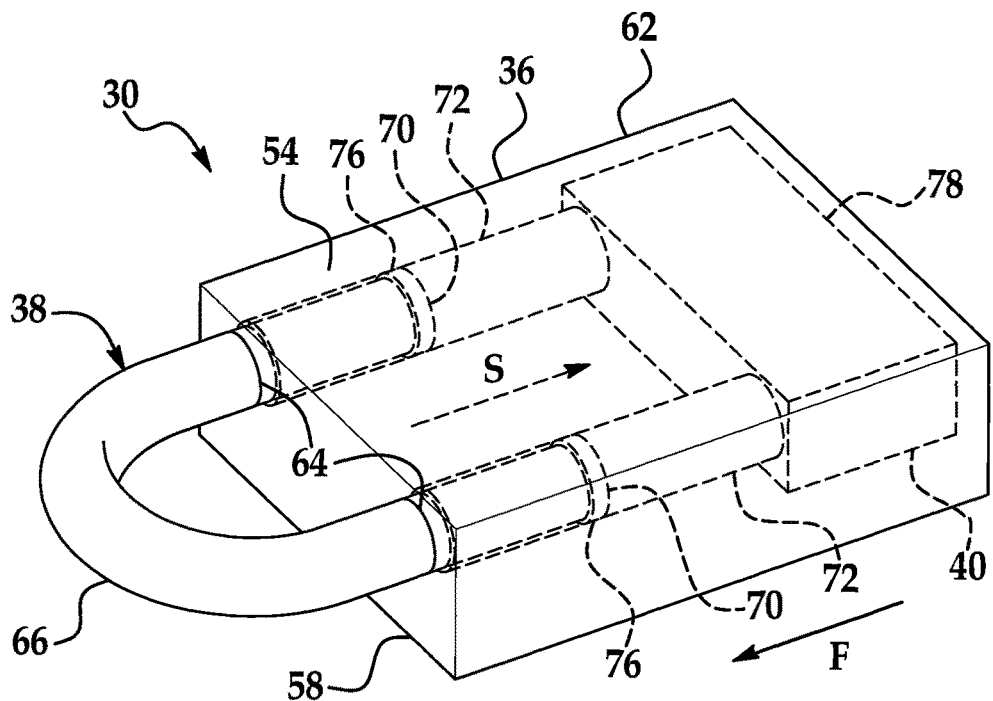
FIG. 6 is a perspective view of a third example tow apparatus.
Figure 7:
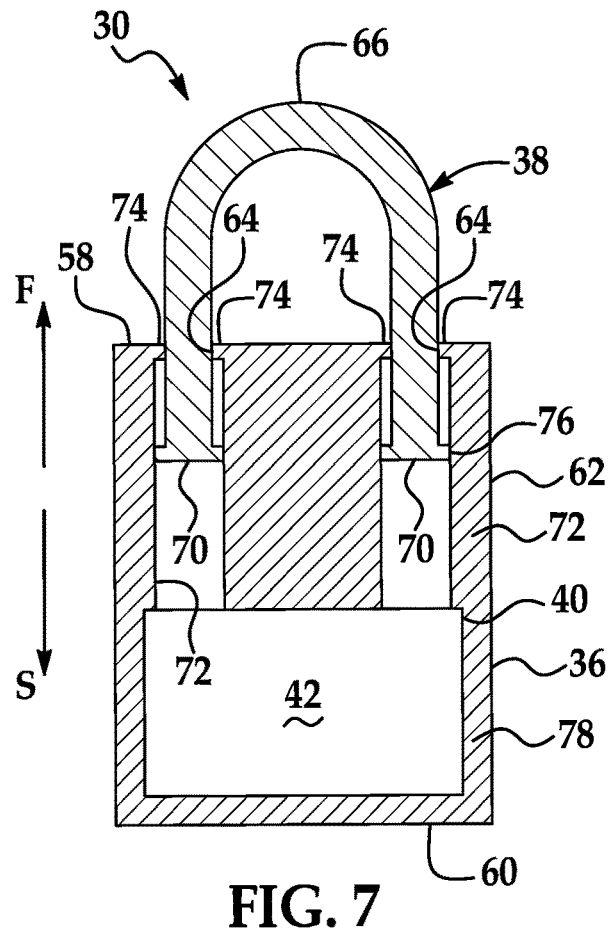
FIG. 7 is a top cross-sectional view of the third example tow apparatus.

FIGS. 6 and 7 show a third example of the tow apparatus 30. The bar member 66 includes the two ends 70, and the bar member 66 is elongated from one of the ends 70 to the other of the ends 70. The bar member 66 is U-shaped. The ends 70 of the bar member 66 include flanges 76.

With continued reference to the example in FIGS. 6 and 7, the housing 36 includes two tunnels 72 and a connecting chamber 78. The two tunnels 72 are parallel to each other and sized to receive the ends 70 of the bar member 66. The tunnels 72 are sized to form a watertight and/or airtight seal with the flanges 76. The tunnels 72 terminate at the openings 64 and extend from the openings 64 to the connecting chamber 78. The openings 64 each include a lip 74 extending inward relative to each tunnel 72. The lips 74 are positioned to prevent the ends 70 from sliding entirely out of the housing 36. For example, the lips 74 may each circumscribe an area larger than the cross-sectional area of the bar member 66 and smaller than the cross-sectional area of the flanges 76. The connecting chamber 78 is open to the two tunnels 72, and the compressible fluid 42 can flow freely among the connecting chamber 78 and the two tunnels 72. The closed chamber 40 is defined by the two ends 70 of the bar member 66, the two tunnels 72, and the connecting chamber 78. The volume of the closed chamber 40 is equal to the volume of the connecting chamber 78 plus the cross-sectional area of the two tunnels 72 multiplied by a distance from the connecting chamber 78 to the ends 70 of the bar member 66. As the ends 70 of the bar member 66 slide closer to the connecting chamber 78, the volume decreases and the pressure of the compressed fluid increases.

For all three examples, in operation, the pressure of the compressed fluid typically presses the tow hook 38 in a direction out of the housing 36, i.e., in the forward direction F. The compressed fluid may press the tow hook 38 against the lip(s) 74, and the lips 74 prevent the tow hook 38 from sliding out of the housing 36. In the event that the vehicle 34 impacts an object and the tow hook 38 is aligned with the position of the object, the force of the impact with the object causes the tow hook 38 to slide into the housing 36, decreasing the volume of the closed chamber 40 and compressing the compressible fluid 42. The compression of the compressible fluid 42 can absorb energy from the impact. The sliding of the tow hook 38 may thus decrease a maximum force experienced by the object.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A tow apparatus comprising:
a front bumper;
a housing rigidly attached to the front bumper; and
a tow hook slidable in the housing;

wherein the housing and the tow hook define a closed chamber;

the closed chamber is filled with a compressible fluid;

the tow hook includes a bar member having a curved shape;

the tow hook includes a base member;

the base member is slidable in the housing;

the bar member is U-shaped and is elongated from one end to another end; and the ends are directly attached to the base member.

2. The tow apparatus of claim 1, wherein the housing defines a sliding direction of the tow hook, the bar member is elongated from an end that is directly attached to the base member, and the cross-sectional area of the end of the bar member orthogonal to the sliding direction is less than the cross-sectional area of the base member orthogonal to the sliding direction.

3. The tow apparatus of claim 2, wherein the housing includes a tunnel receiving the base member and terminating at an opening, and the opening includes a lip extending inward relative to the tunnel.

4. The tow apparatus of claim 3, wherein the housing includes a back wall, the tunnel extends to the back wall, and the closed chamber is defined by the tow hook, the tunnel, and the back wall.

5. The tow apparatus of claim 1, wherein the front bumper defines a forward direction, and the tow hook is slidable in the housing along the forward direction.

6. The tow apparatus of claim 1, further comprising a frame member transverse to and fixed to the front bumper, wherein the housing is directly attached to the frame member.

7. The tow apparatus of claim 6, wherein a top surface of the housing is directly attached to a bottom surface of the frame member.

8. The tow apparatus of claim 7, wherein the top surface of the housing is fastened to the bottom surface of the frame member.

9. The tow apparatus of claim 1, wherein the compressible fluid is a compressible gas.

10. The tow apparatus of claim 1, wherein the compressible fluid is a non-Newtonian fluid.

11. The tow apparatus of claim 10, wherein the compressible fluid is a shear-thinning fluid.

12. The tow apparatus of claim 1, wherein sliding the tow hook in the housing in a direction that decreases the volume of the closed chamber compresses the compressible fluid.

13. A tow apparatus comprising:

a front bumper;

a housing rigidly attached to the front bumper; and a tow hook slidable in the housing;

wherein the housing and the tow hook define a closed chamber;

the closed chamber is filled with a compressible fluid;

the tow hook includes a bar member having a curved shape;

the bar member includes two ends and is elongated from one end to the other end; and the housing includes two parallel tunnels sized to receive the ends of the bar member.

14. The tow apparatus of claim 13, wherein the housing includes a connecting chamber open to both tunnels, and the closed chamber is defined by the two ends of the bar member, the two tunnels, and the connecting chamber.

15. A tow apparatus comprising:

a front bumper;

a housing rigidly attached to the front bumper; and a tow hook slidable in the housing;

wherein the housing and the tow hook define a closed chamber;

the closed chamber is filled with a compressible fluid;

the tow hook includes a bar member having a curved shape;

the tow hook includes a base member;

the base member is slidable in the housing;

the housing defines a sliding direction of the tow hook;

the bar member is elongated from an end that is directly attached to the base member; and the cross-sectional area of the end of the bar member orthogonal to the sliding direction is less than the cross-sectional area of the base member orthogonal to the sliding direction.

16. The tow apparatus of claim 15, wherein the housing includes a tunnel receiving the base member and terminating at an opening, and the opening includes a lip extending inward relative to the tunnel.

17. The tow apparatus of claim 16, wherein the housing includes a back wall, the tunnel extends to the back wall, and the closed chamber is defined by the tow hook, the tunnel, and the back wall.

* * * * *